Oct. 20, 1964 E. L. ADAMS 3,153,686
ELASTIC MELT EXTRUSION METHOD AND APPARATUS
Filed Jan. 3, 1961 2 Sheets-Sheet 1

INVENTOR.
ELMER L. ADAMS
BY W. A. Schaich &
Charles S. Lynch
ATTORNEYS

Oct. 20, 1964  E. L. ADAMS  3,153,686
ELASTIC MELT EXTRUSION METHOD AND APPARATUS
Filed Jan. 3, 1961  2 Sheets-Sheet 2
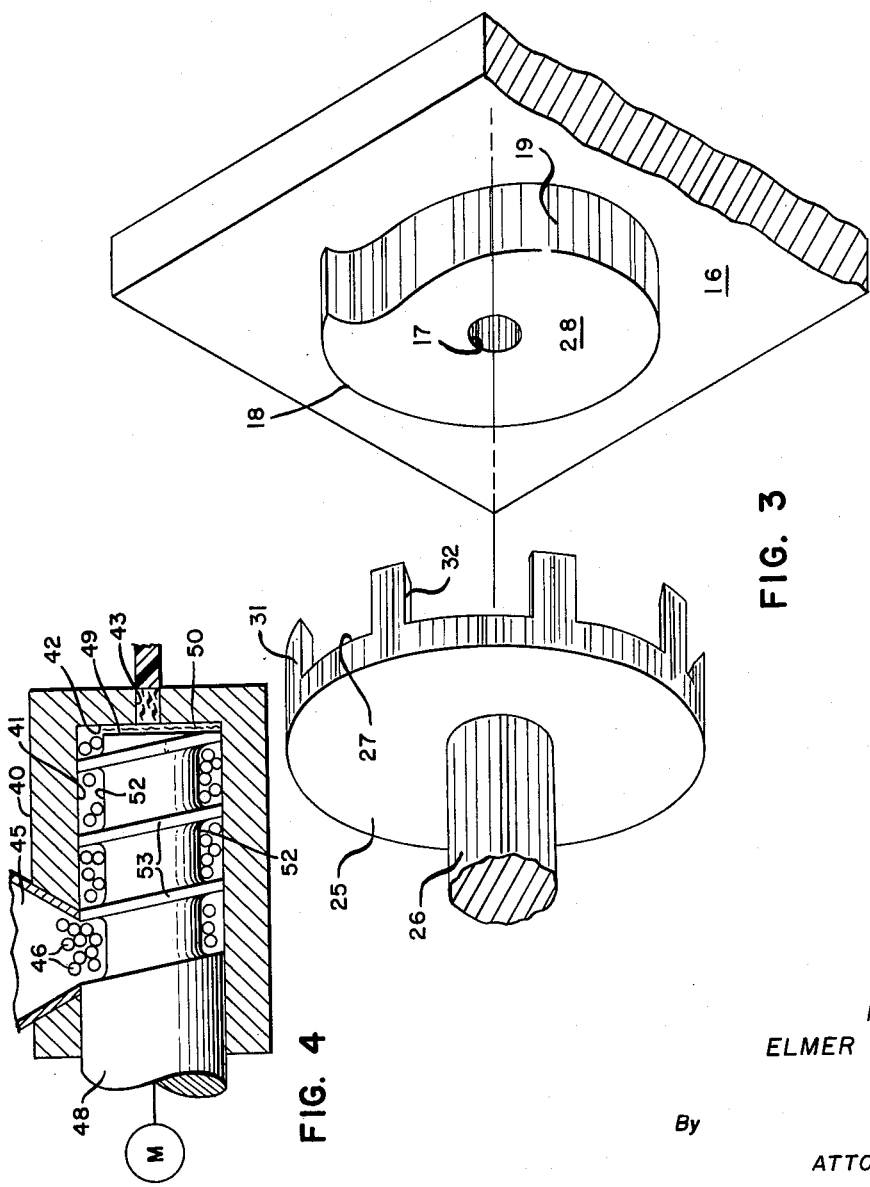
INVENTOR
ELMER L. ADAMS
By
ATTORNEYS

United States Patent Office 3,153,686
Patented Oct. 20, 1964

3,153,686
ELASTIC MELT EXTRUSION METHOD
AND APPARATUS
Elmer L. Adams, Toledo, Ohio, assignor to Owens-Illinois Glass Co., a corporation of Ohio
Filed Jan. 3, 1961, Ser. No. 80,383
8 Claims. (Cl. 264—176)

The present invention relates to an elastic melt extruder and to a method of operating such as extruder. More particularly, this invention relates to an elastic melt extruder in which solid plastic material is fed to a shearing gap by rotatable feeding means.

There has been recently developed a new type of plasticizer-extruder, commonly known as an "elastic melt extruder" utilizing "the normal force effect," i.e., the normal force developed when a visco-elastic material is sheared between a rotating plate and a stationary plate, to perform the functions of a conventional plasticizer-extruder. Such an elastic melt extruder is described in detail in "Modern Plastics Magazine" of October 1959, at page 107, in an Article by Bryce Maxwell and Anthony J. Scalora.

Such an elastic melt extruder utilizes a power-driven, rotatable disc operable within a convolute chamber to which solid plastic material is furnished from a supply hopper or the like. A radial face of the disc is spaced through a narrow gap from the corresponding face of an orifice plate having an exit orifice axially aligned with the disc. As the disc is rotated, the thermoplastic material introduced peripherally of the disc and confined between the radial shearing faces of the disc and the orifice plate is subjected to shearing forces. The thermoplastic material is essentially elastic and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

In a conventional elastic melt extruder, as above described, the solid plastic material is fed to the shearing gap by gravity flow from an overhead hopper. During the operation of such conventional devices, the granulated solid material may bridge over the entrance passage to the shearing gap to interrupt, at least momentarily, the uniform feeding of the material. Further, it is difficult to obtain uniform feeding peripherally of the shearing gap. The present invention prevents these difficulties by providing an improved positive feed means for insuring the constant, peripheral flow of plastic material to the shearing gap. Additionally, the positive feeding of solid plastic material to the gap results in the issuance of plastic material at pressures higher than those generated in conventional elastic melt extruders.

In one form of the present invention, the positive feeding means takes the form of feed projections or fingers formed integrally with the rotatable shearing disc and surrounding a helical peripheral surface on the fixed shearing plate, the fingers being, in effect, interposed between the feeding throat of the hopper and the shearing gap. The feeding fingers, being rotatable with the disc, maintain the throat open for feeding efficiency, and the fingers, passing peripherally of the helical fixed plate surface distribute material peripherally thereof to insure full and even distribution of material for radial passage through the shearing gap.

In another form of the invention, the feeding means takes the form of a helical screw thread of fairly short length formed on the rotatable disc element and as an extension thereof to feed material from the hopper throat axially of the rotatable disc member for passage into the shearing gap. In this form of the invention, the feed screw maintains the feeding throat open for the passage of granulated material therethrough, the screw also forces the material axially of the disc into radial registry with the shearing gap.

It is, therefore, an important object of the present invention to provide an elastic melt extruder provided with rotatable feeding means positively displacing granulated plastic material from a feed hopper to a shearing zone.

Another important object of this invention is the provision of an elastic melt extruder having a shearing gap defined between a rotatable shearing disc and a fixed shearing face and wherein the shearing disc is provided with integral feeding means rotatable therewith for positively displacing solid plastic material to the shearing zone for passage therethrough.

It is a further important object of this invention to provide an elastic melt extruder wherein a rotatable shearing disc is provided with feeding fingers movable therewith and operable to feed solid plasticized material from a supply hopper to a shearing zone.

Yet another important object of this invention is the provision of an elastic melt extruder wherein a rotatable shearing disc is provided with an integral helical feed screw for positively feeding material from a hopper to a terminal shearing face of the disc.

Other objects of this invention will appear in the following description and appended claims, reference being had to the accompanying drawings forming a part of this specification wherein like reference characters designate corresponding parts in the several views.

On the drawings:

FIGURE 3 is an exploded perspective view of the parts of the extruder defining the shearing gap; and FIGURE 4 is a view similar to FIGURE 2 illustrating a modified embodiment of the extruder of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
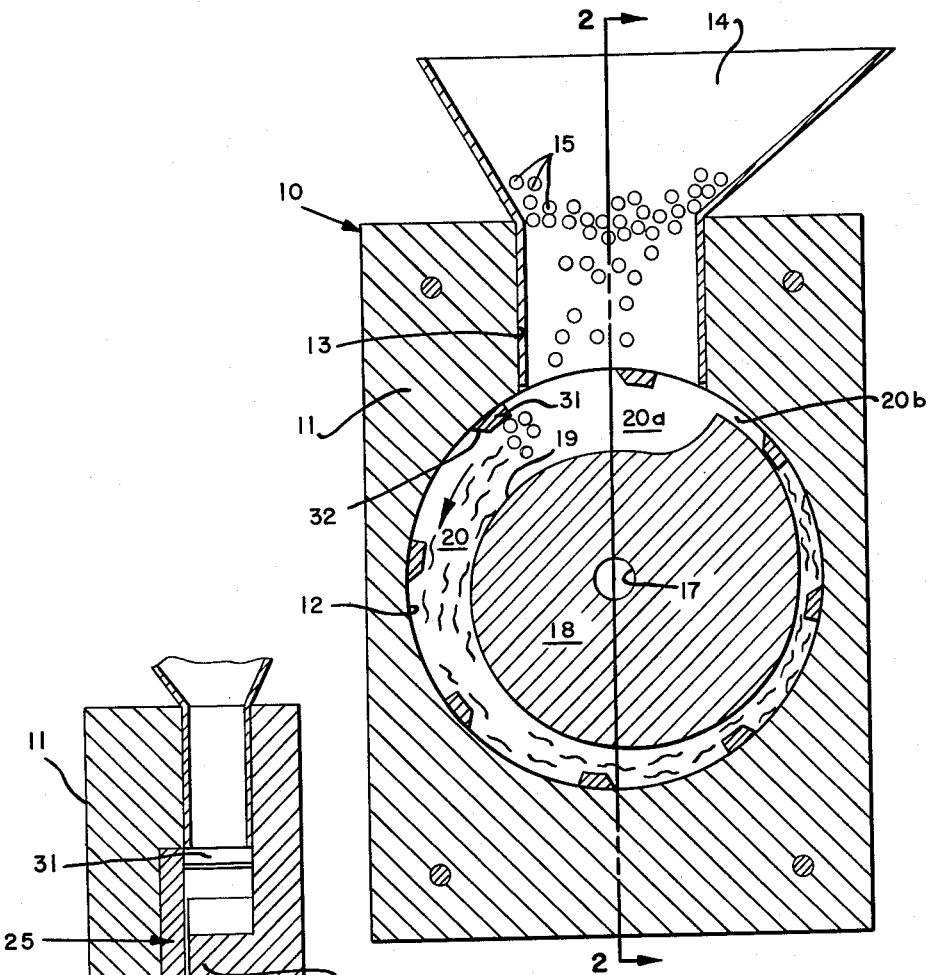
FIGURE 1 is a vertical sectional view taken through an elastic melt extruder of the present invention.

As shown on the drawings in FIGURE 1 reference numeral 10 refers generally to an elastic melt extruder of the present invention comprising a body or casing 11 having a circular opening therein defining a cylindrical chamber 12 communicating through a radial, upwardly extending feed opening 13 with an overhead hopper 14 adapted to contain granulated plastic material 15.

The open radial face of the chamber 12 is closed by a cover plate 16 (FIGURE 2) having a central, axially extending extrusion orifice 17 communicating with the chamber 12. Formed on the cover plate 16 and projecting into the chamber 12 is an embossment 18 having a helical peripheral surface 19 eccentric to the axis of the chamber 12, the surface 19 cooperating with the peripheral wall of the chamber 12 to define therebetween a peripheral path 20 of varying cross-sectional configuration.

More specifically, the inlet passage 20 varies from a maximum cross-sectional portion 20a registering with the inlet opening 13 to a minimum cross-sectional portion 20b displaced in a counterclockwise direction from the inlet opening 13.

Located within the chamber 12 is a rotatable shearing disc 25 of substantially the same diameter as the chamber 12 and having a radial, terminal shearing face 27 closely spaced from a corresponding radial, terminal face 28 of the embossment 18 to define therebetween a shearing gap 30. The disc 25 is rotated by suitable means, as by motor M.

Carried by the rotatable shearing disc 25 are a plurality of peripherally spaced, axially projecting agitating or feed fingers 31. Such fingers project across the chamber 12 and are in close running fit with the peripheral wall of the chamber so that the fingers project across the juncture of the inlet opening 13 and the space 20 intermediate the periphery 19 of the embossment 18 and the peripheral wall of the chamber 12. The disc 25 is rotatable in a counterclockwise direction, when viewed as in FIGURE 1 of the drawings, and each of the fingers is provided with a leading edge 32 which is chamfered or sloped inwardly, so that the face 32 will urge solid plastic material 15 within the peripheral feed chamber 20 radially inwardly upon rotation of the shearing disc. The radial extent of the fingers 31 is such that the fingers pass through the reduced cross-sectional area 20b of the chamber 20 in close running relation to the helical periphery 19 adjacent its point of greatest diameter.

Figure 2:
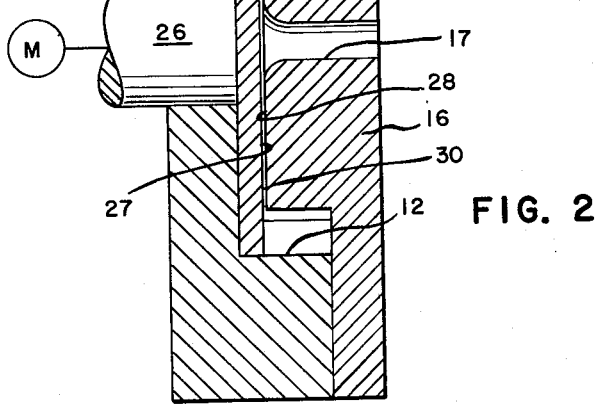
FIGURE 2 is a sectional view taken along the plane 2—2 of FIGURE 1.

The operation of the device illustrated in FIGURES 1, 2 and 3 will be readily appreciated inasmuch as solid, granular or particulate plastic material 15 fed from the hopper 14 into the chamber 20 will be impelled by the fingers 31 peripherally of the fixed helical periphery 19 of the embossment 18. The fingers 31 will also scrape off and positively radially feed plastic material from the hopper 14 into the shearing gap 30. Due to the helical configuration of the periphery 19 of the embossment 18, the fingers 31 will also serve to distribute the material more or less uniformly peripherally of the shearing gap 30, thereby materially aiding the plasticizing function.

Of course, the rotatable shearing disc 25 and the fixed shearing face 28 cooperate as in a conventional elastic melt extruder to shear the material in the shearing gap 30 and to express molten material as extrudate, through the extrusion orifice 17.

In that embodiment of applicant's invention shown in FIGURE 4 of the drawings, the elastic melt extruder includes an axially elongated casing 40 having an interior cylindrical passage 41 terminating in a radial fixed shearing plate face 42 having a central extrusion orifice 43. An overhead hopped 45 is provided to feed granulated plastic material 46 to an axially elongated feed screw 48 positioned in the cylindrical passage 41 and terminating in a radial movable shearing face 49 spaced from the fixed shearing face 42 through the shearing gap 50. The shearing element 48 is driven by suitable means, as by motor M.

The cylindrical periphery of the element 48 is provided with a helically threaded surface defined by grooves 52 and inclined lands 53 therebetween. It will be readily appreciated that the grooved periphery of the member 48 is effective to axially displace the particulated plastic material 46 from the hopper 45 to the shearing zone 50 for displacement through the axial extrusion orifice 43. Not only does the threaded periphery of the member 48 positively feed material to the shearing zone 50, but a more positive forced feeding will be provided than in the embodiment of the invention shown in FIGURES 1 through 3 and the output through the extrusion orifice 43 will be at a higher pressure. It should be emphasized that the screw periphery of the element 48 serves no plasticizing or extruding function, but rather such functions are carried out solely at the shearing gap 50.

Thus, it will be seen that the present invention provides means for positively feeding particulate plastic material from a gravity feed hopper to a shearing zone. The advantages of positive feeding, uninterrupted operation, and continuous and steady feeding from all points at the periphery of the shearing zone will be readily apparent.

I claim:

1. In a method of extruding plastic material from particulate plastic material from a supply hopper into an elastic melt shearing zone defined between the confronting radial faces of a pair of relatively rotatable shearing elements, the steps of rotating a feed element with one of said shearing elements into contact with particulate material intermediate said hopper and said shearing zone, said feed element (1) conveying said particulate material peripherally of the shearing zone to distribute the material externally of said zone, and (2) forcibly directing said particulate material radially for entry into said shearing zone.

2. In an elastic melt extruder, a rotatable shearing disc and a fixed shearing face cooperably defining therebetween a confined shearing zone extending radially of said disc and said face to surround a central outlet orifice, said shearing face being circumscribed by a helical peripheral wall, an overhead hopper from which particulate plastic material flows by gravity toward said wall, and a plurality of peripherally spaced feed fingers telescoping over the helical peripheral wall and radially overlapping said shearing zone, said fingers being carried by the rotatable disc for movement therewith intermediate said hopper and said wall and outside the confines of said shearing zone to advance peripherally of said zone particulate material gravity fed from said hopper, said material being distributed by said fingers about said shearing zone for entry thereinto and for radial displacement therethrough toward said orifice.

3. In an elastic melt extruder, a rotatable shearing disc having a radial face, a fixed shearing plate having a radial face spaced axially from the face of said disc through a shearing gap and encompassed by a helical peripheral wall, and means for introducing particulate plastic material into said gap, said means including a plurality of individual feeding projections integral with said disc and projecting axially therebeyond in surrounding relation to the helical peripheral wall of said shearing plate, said projections lying wholly exteriorly of said shearing gap to positively displace particulate plastic material peripherally of the plate periphery, and said projections having inclined leading edges directing the particulate material radially toward the gap.

4. In an elastic melt extruder, a rotatable shearing disc having a radial face, a fixed shearing plate having a radial face spaced axially from the face of said disc through a shearing gap and encompassed by a peripheral wall, and means for introducing particulate plastic material into said gap, said means including a cylindrical feed passage concentric with said rotatable shearing disc and opening freely at one extremity onto the prepiheral wall of said radial face for communication with said shearing gap, a supply hopper communicating with the other extremity of said feed passage to supply particulate material thereto, and a rotatable feed element projecting axially through said passage and having a peripheral helical thread thereon in close running fit in said feed passage, said feed element being rotatable with said shearing disc, the peripheral helical thread on said feed element positively displacing particulate plastic material through said feed passage from said hopper into radial alignment with, but peripherally outside, said shearing gap, said helical thread forcibly directing particulate material fed thereby against the plate face to be displaced radially into said zone.

5. In a method of extruding plastic material from an elastic melt extruder by the gravity introduction of particulate plastic material from a supply hopper into a radial shearing zone defined between a rotatably driven shearing disc and a fixed shearing face having a central outlet orifice, the hopper being axially spaced from the shearing zone, the steps of axially advancing particulate material from said hopper into radial alignment with said zone but peripherally outside said zone, and forcibly injecting the particulate material radially into the shearing zone for passage therethrough to said outlet orifice.

6. An elastic melt extruder comprising relatively rotatable shearing disc and shearing face elements having spaced faces cooperably defining therebetween a radial shearing zone, an overhead hopper spaced from said zone and from which particulate plastic material flows by gravity toward said zone, and rotatable positive displacement feed means carried by the rotatable element for movement therewith, said means projecting axially beyond said spaced faces and movable in the space intermediate said hopper and said zone (1) to positively displace particulate material gravity fed from said hopper into radial alignment with said shearing zone but peripherally outside said zone and (2) to forcibly direct such particulate material radially into said zone.

7. An elastic melt extruder comprising plates which define a shearing gap, means for producing relative rotation between said plates to plasticize material in said gap and for producing a force to move said material through said gap, and feed means fixed to at least one of the plates and passing peripherally about said path to augment said force to move said plasticized material through said gap.

8. An elastic melt extruder comprising a pair of plates which define a shearing gap therebetween including an outlet orifice, a hopper for feeding plastic granular material into said gap, means for rotating one of said plates, relative rotation between said plates plasticizing said plastic granular material and producing a force to move centripetally said material through said gap and out of said orifice, and feeding means fixed to said one of said plates and interposed between said hopper and said gap, said last named means passing peripherally of said gap to augment said force produced by said relative rotation to move said plasticized material through said gap.

References Cited in the file of this patent

UNITED STATES PATENTS

| 1,156,096 | Price | Oct. 12, 1915 |
| 1,375,623 | Bartels | Apr. 19, 1921 |
| 1,537,348 | Grossmann | May 12, 1925 |
| 1,560,368 | Bartels | Nov. 3, 1925 |
| 2,369,553 | Fields | Feb. 13, 1945 |
| 2,787,022 | Chisholm | Apr. 2, 1957 |
| 2,977,632 | Bunch | Apr. 4, 1961 |
| 3,025,565 | Doriat et al. | Mar. 20, 1962 |
| 3,032,814 | Miner | May 8, 1962 |
| 3,046,603 | Maxwell | July 31, 1962 |
| 3,082,476 | Bunch | Mar. 26, 1963 |

FOREIGN PATENTS

| 647,946 | Germany | July 17, 1937 |
| 834,826 | Germany | July 8, 1949 |
| 1,221,112 | France | May 31, 1960 |

OTHER REFERENCES

Maxwell and Scalora article, October 1959, Modern Plastics, pages 107–114 and 202–210.